(12) United States Patent  (10) Patent No.: US 10,051,849 B2
Nitta  (45) Date of Patent: Aug. 21, 2018

(54) BAIT RIGGING SYSTEM

(71) Applicant: Gye S. Nitta, Honolulu, HI (US)

(72) Inventor: Gye S. Nitta, Honolulu, HI (US)

(*) Notice: Subject to any disclaimer, the term of this patent is extended or adjusted under 35 U.S.C. 154(b) by 285 days.

(21) Appl. No.: 15/205,829

(22) Filed: Jul. 8, 2016

(65) Prior Publication Data

US 2017/0006846 A1 Jan. 12, 2017

Related U.S. Application Data

(60) Provisional application No. 62/189,907, filed on Jul. 8, 2015.

(51) Int. Cl.
A01K 91/18 (2006.01)
A01K 95/02 (2006.01)

(52) U.S. Cl.
CPC .............. A01K 91/18 (2013.01); A01K 95/02 (2013.01)

(58) Field of Classification Search
CPC ........ A01K 83/06; A01K 91/03; A01K 91/04; A01K 91/18; A01K 95/02
See application file for complete search history.

(56) References Cited

U.S. PATENT DOCUMENTS

| | | | | |
|---|---|---|---|---|
| 2,207,319 A * | 7/1940 | Hollopeter | ............. | A01K 83/06 43/44.6 |
| 4,067,135 A * | 1/1978 | Martin | ................... | A01K 83/06 43/43.14 |
| 4,133,132 A * | 1/1979 | Ellis | ........................ | A01K 85/16 43/41 |
| 4,848,023 A * | 7/1989 | Ryder | ..................... | A01K 83/06 43/41 |
| 4,910,907 A * | 3/1990 | Schlaegel | .............. | A01K 83/06 43/44.6 |
| 4,932,154 A * | 6/1990 | Andreetti | ............... | A01K 83/06 43/44.6 |
| 5,386,661 A * | 2/1995 | Davis | ...................... | A01K 83/06 43/44.2 |
| 5,893,232 A * | 4/1999 | Horton | .................... | A01K 83/06 43/42.35 |
| 6,516,552 B2 * | 2/2003 | Hawkins | ................. | A01K 85/00 43/42.09 |
| 6,658,785 B1 * | 12/2003 | Faulkner | ................. | A01K 83/06 43/42.36 |
| 7,735,257 B1 * | 6/2010 | Firmin | .................... | A01K 85/00 43/44.2 |
| 8,024,887 B2 * | 9/2011 | Milanowski | ........... | A01K 85/12 43/42.2 |

(Continued)

Primary Examiner — Michael H Wang

(57) ABSTRACT

A bait rigging system is used to mount a bait fish onto a fishing line. The system includes a tubular body and a line-securing clamp. The tubular body can be inserted into the mouth of a bait fish in order to guide the fishing line through the bait fish. The line-securing clamp is mounted into the tubular body and is used to lock the tubular body onto the fishing line. The system also includes a weight adjustment arm and a weight. The weight is connected to the weight adjustment arm and causes the bait fish sink. The weight adjustment arm is connected to the tubular body and may be rotated to compensate for different sized bait fish. An arm spike is connected to the weight adjustment arm and is used to secure the weight adjustment arm to the bait fish by piercing the mouth of the bait fish.

19 Claims, 7 Drawing Sheets

(56) References Cited

U.S. PATENT DOCUMENTS

| | | | |
|---|---|---|---|
| 8,938,907 B2* | 1/2015 | Meade | A01K 85/08 43/42.09 |
| 2012/0055065 A1* | 3/2012 | Camilleri | A01K 83/06 43/4.5 |

* cited by examiner

BAIT RIGGING SYSTEM

The current application claims a priority to the U.S. Provisional Patent application Ser. No. 62/189,907 filed on Jul. 8, 2015.

FIELD OF THE INVENTION

The present invention relates generally to fishing equipment. More specifically, the present invention is a bait rigging system which is used to compress fishing line and pull a dead bait fish from the mouth.

BACKGROUND OF THE INVENTION

There are many different methods of rigging bait to fishing lines. Often, simple rigs rely solely on the use of hooks and/or zip ties. Though generally effective, such simple rigs can be unstable. This can lead to losing bait or not hooking a fish when the fish bites. As a result, time and energy may be wasted while fishing without bait. Further, losing bait can prove costly for avid fishers.

Accordingly, there is a present need for an improved system for rigging bait fish to a fishing line. The present invention is a bait rigging system which is used to securely mount a dead bait fish onto a fishing line. The present invention is positioned along a fishing line using a line-securing clamp. A tubular body of the present invention is inserted into the mouth of the bait fish and helps to guide the fishing line through the bait fish. The present invention includes an adjustable weight which can be positioned to secure the bait fish to the fishing line and to streamline the present invention.

DETAILED DESCRIPTION OF THE INVENTION

All illustrations of the drawings are for the purpose of describing selected versions of the present invention and are not intended to limit the scope of the present invention.

Figure 1:
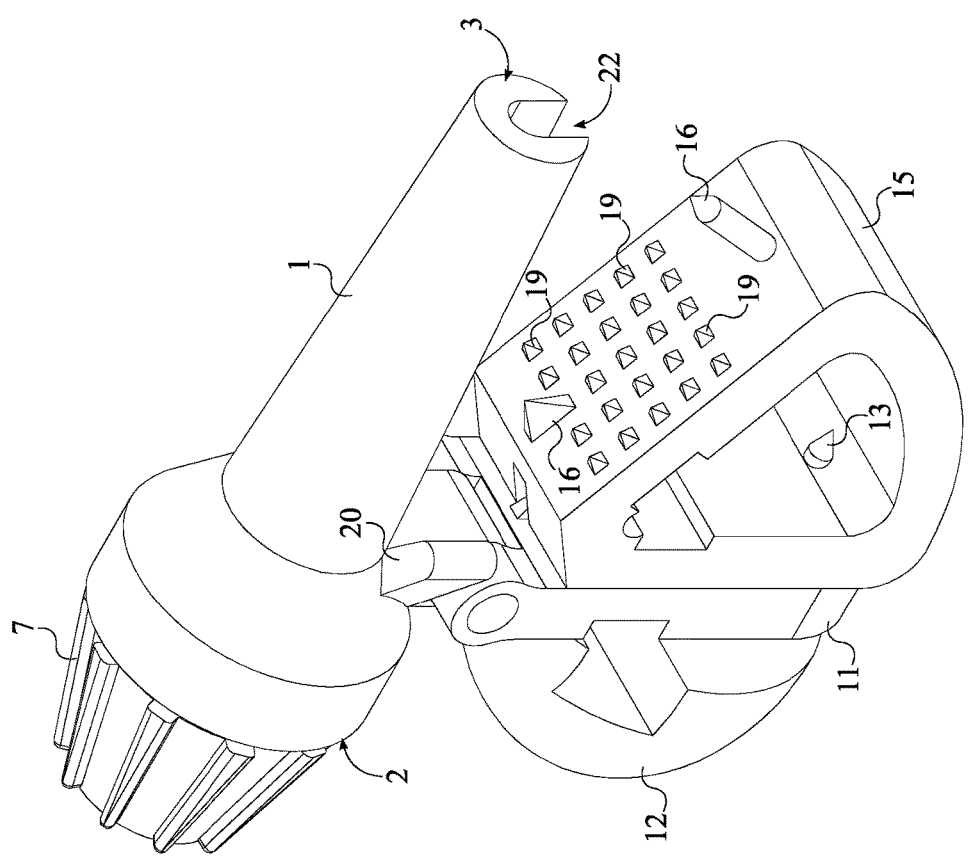
FIG. 1 is a top front perspective view of the present invention.
Figure 2:
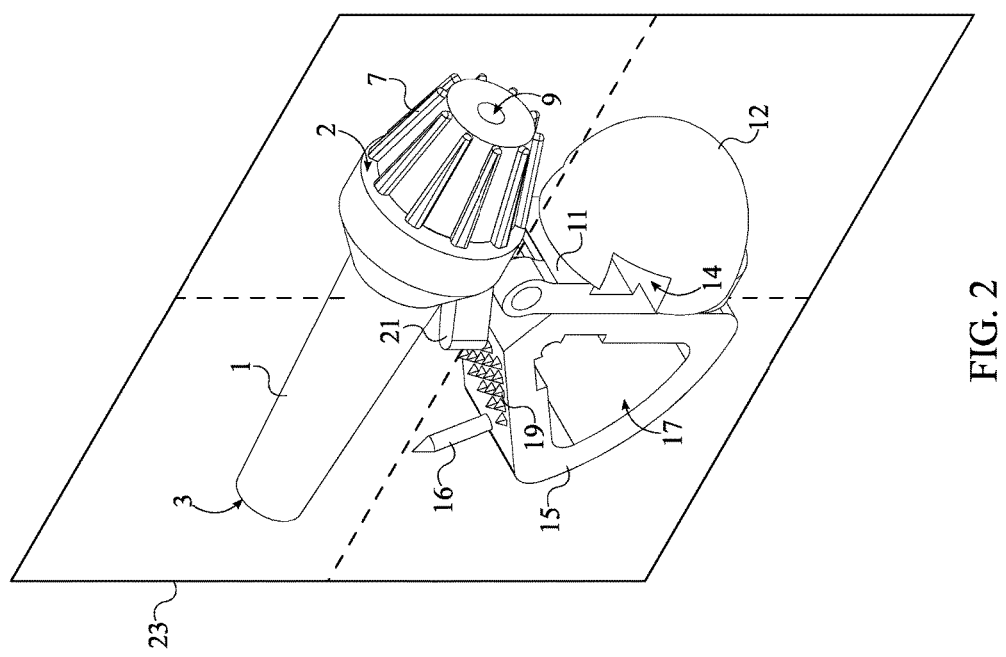
FIG. 2 is a top rear perspective view of the present invention.

With reference to FIGS. 1-2, the present invention is a bait rigging system which is used to attach a dead fish to a fishing line for use as bait. The present invention allows the bait fish to be towed in a manner that visually replicates the movements of a living fish. The present invention comprises a tubular body 1, a line-securing clamp 7, a weight adjustment arm 11, a weight 12, and at least one arm spike 13. The tubular body 1 is used to guide fishing line into the mouth of a bait fish. The tubular body 1 comprises a first end 2 and a second end 3. The tubular body 1 tapers from the first end 2 to the second end 3. As a result, the tubular body 1 may be easily inserted into the mouth of the bait fish. The line-securing clamp 7 is mounted into the first end 2 and is used to mount the tubular body 1 to the fishing line. The weight adjustment arm 11 is used to change the orientation of the weight 12 to optimize the balance of how the bait fish is mounted to the present invention. The weight adjustment arm 11 is laterally positioned in between the first end 2 and the second end 3 and is hingedly connected to the tubular body 1. Depending on the size of the bait fish, the weight adjustment arm 11 may be angularly oriented to fit around the mouth of the fish. The weight 12 is laterally connected to the weight adjustment arm 11 and is used to ensure that the bait fish travels forward in the water. The weight 12 is positioned offset from the tubular body 1 along the weight adjustment arm 11 and is positioned towards the first end 2. This arrangement between the tubular body 1, the weight 12, and the weight adjustment arm 11 streamlines the weight 12 in the water. The at least one arm spike 13 is used to secure the bait fish to the present invention by puncturing into the mouth of the bait fish. The at least one arm spike 13 is laterally connected to the weight adjustment arm 11, opposite to the weight 12. The at least one arm spike 13 is positioned perpendicular to the weight adjustment arm 11. This arrangement between the arm spike 13 and the weight adjustment arm 11 allows the weight adjustment arm 11 to be positioned flush against the bottom of the bait fish with the arm spike 13 extending into the body of the bait fish.

Figure 4:
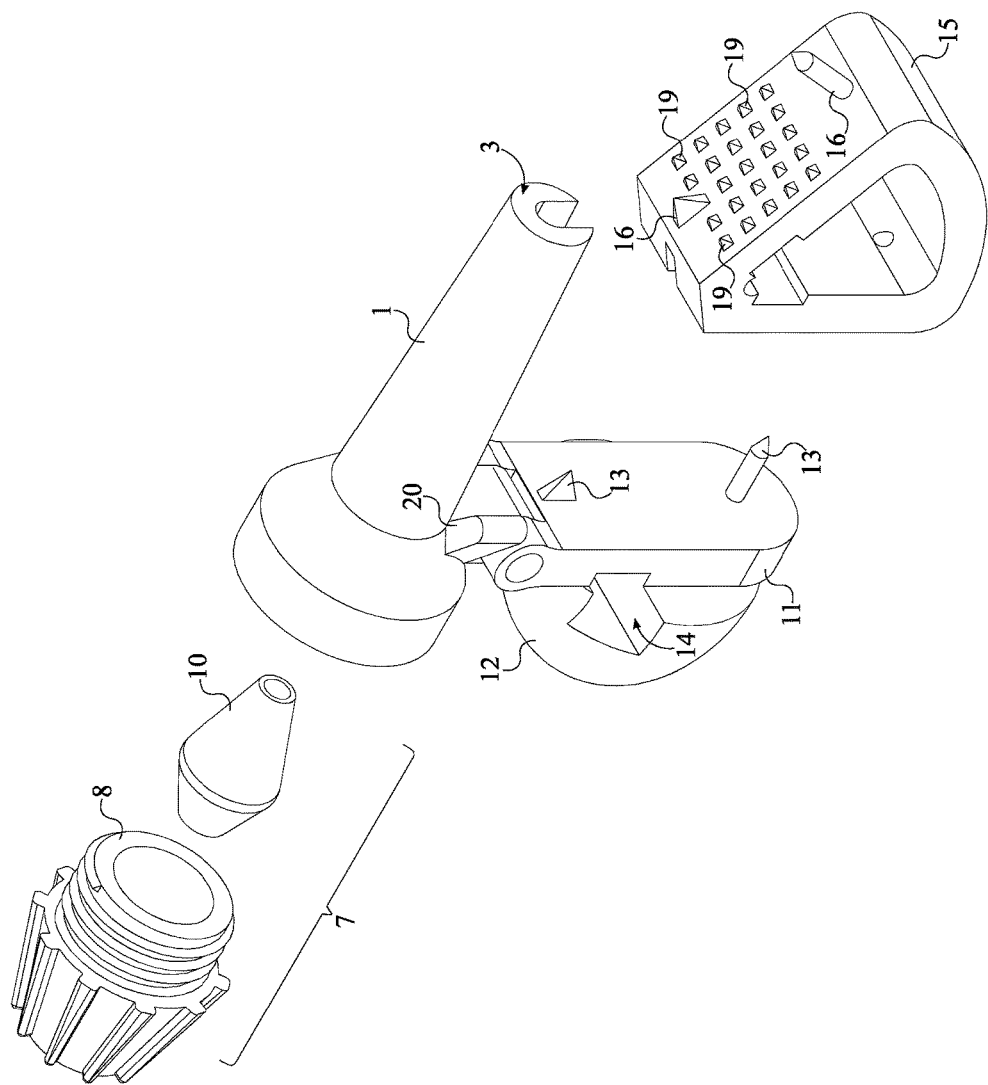
FIG. 4 is an exploded top front perspective view of the present invention.
Figure 6:
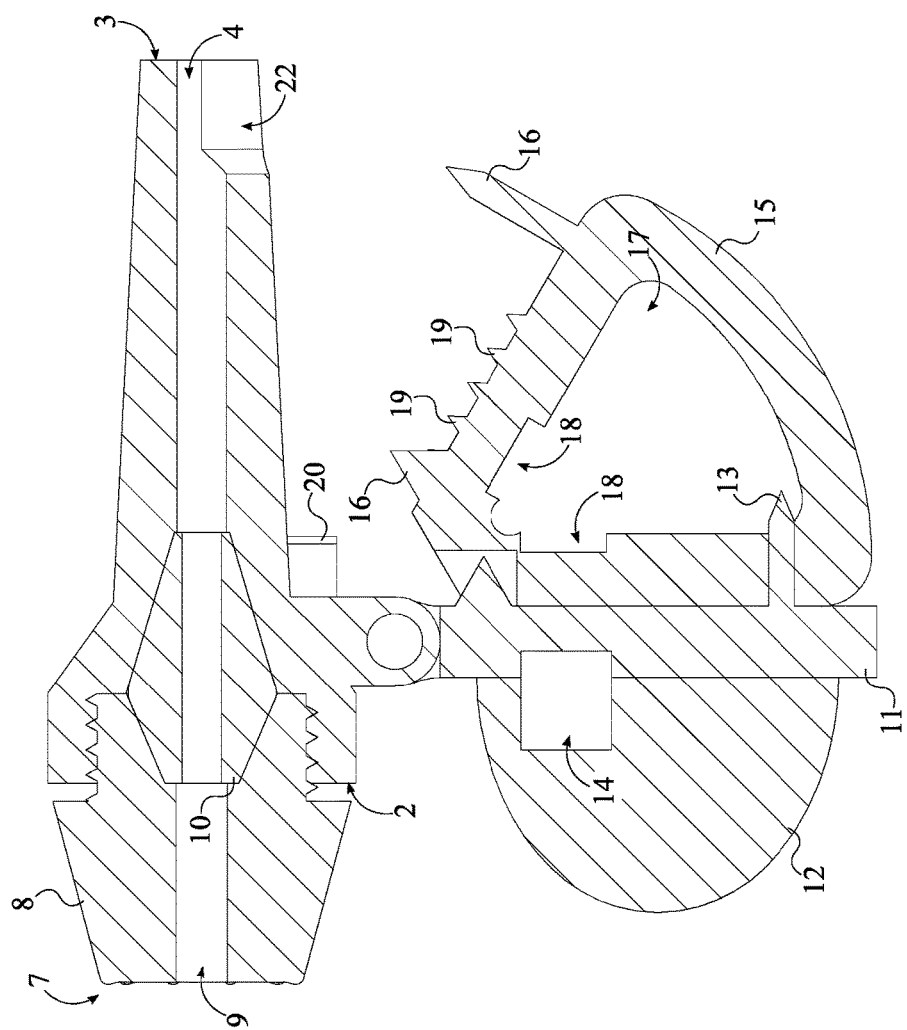
FIG. 6 is a front cross-sectional view of the present invention taken along the sagittal plane shown in FIG. 2.
Figure 7:
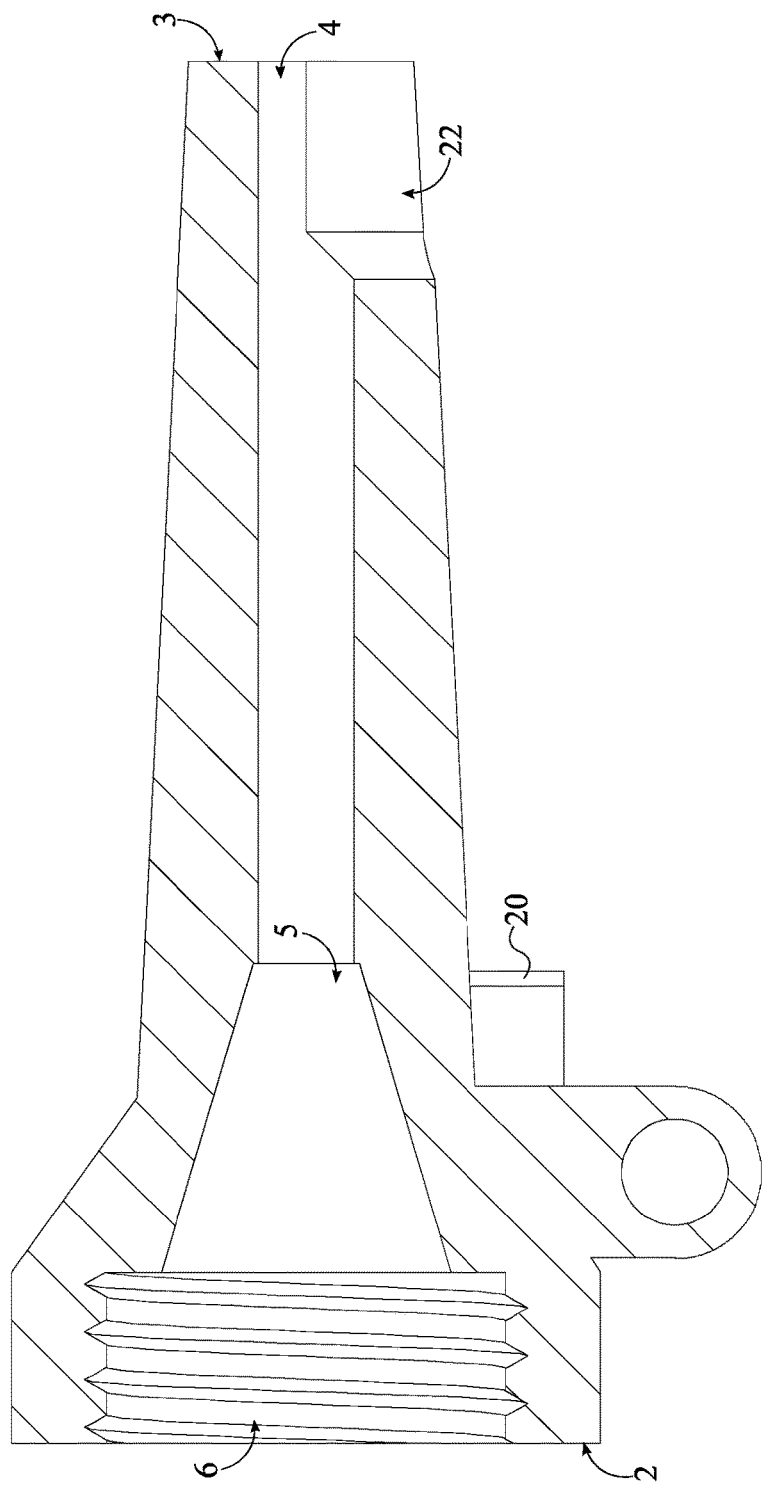
FIG. 7 is a front cross-sectional view of tubular body taken along the sagittal plane shown in FIG. 2.

In reference to FIG. 4, the line-securing clamp 7 comprises a screw 8, a line-receiving channel 9, and a compression sleeve 10. Together, the screw 8 and the compression sleeve 10 are used to secure fishing line into the tubular body 1. The tubular body 1 further comprises a line-receiving hole 4, a tapered hole 5, and a female threaded cavity 6. The line-receiving hole 4 traverses into the tubular body 1 from the second end 3. When in use, the end of the fishing line traverses through the tubular body 1 from the second end 3. The female threaded cavity 6 traverses into the tubular body 1 from the first end 2. In reference to FIGS. 6-7, the female threaded cavity 6 is designed to engage with the screw 8 in order to tighten the screw 8 to the tubular body 1. The tapered hole 5 traverses through the tubular body 1 from the female threaded cavity 6 to the line-receiving hole 4. The tapered hole 5 is used to hold the compression sleeve 10 within the tubular body 1. The screw 8 is threadably engaged to the female threaded cavity 6. The line-receiving channel 9 centrally traverses through and along the screw 8 and is concentrically aligned with the line-receiving hole 4. This arrangement between the line-receiving channel 9 and the screw 8 allows the fishing line to traverse into the tubular body 1, and through the screw 8. When the screw 8 is tightened, the compression sleeve 10 is pressed into the tapered hole 5 by the screw 8. In doing so, the compression sleeve 10 is squeezed around the fishing line to the point that the fishing line is unable to move within the tubular body 1.

Figure 5:
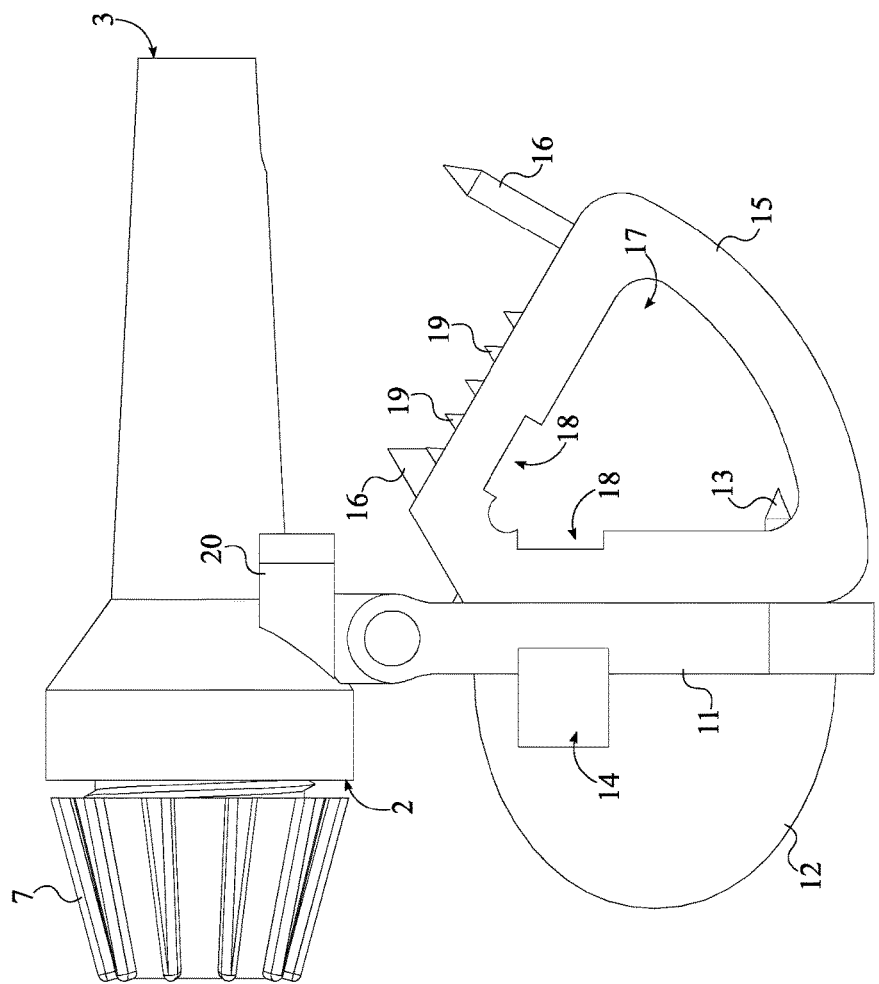
FIG. 5 is a front view of the present invention.

In reference to FIG. 5, the present invention further comprises a weight tie hole 14. The weight tie hole 14 is used for securing the weight 12 and the weight adjustment arm 11 to the bait fish. The weight tie hole 14 traverses through the weight 12 and the weight adjustment arm 11 such that a zip tie, cordage, or some other form of type of fastener may be inserted through the weight tie hole 14. In the preferred embodiment of the present invention, the weight tie hole 14 traverses perpendicular to the tubular body 1 so that a fastener may be easily wrapped around the bait fish without twisting or adjusting the fastener.

In reference to FIGS. 4-5, the present invention further comprises a weight angling wedge 15 and at least one wedge spike 16. The weight angling wedge 15 is used to reposition the weight 12 towards the second end 3 when using larger fish as bait. When in use, the weight angling wedge 15 is mounted onto the arm spike 13 and acts as an extension of the weight adjustment arm 11. The at least one wedge spike 16 is connected adjacent to the weight angling wedge 15, opposite to the weight adjustment arm 11. Further, the at least one wedge spike 16 is oriented towards the second end 3. When using the weight angling wedge 15, the at least one wedge spike 16 acts as replacement for the arm spike 13 by helping to secure the weight angling wedge 15 to the bait fish.

Figure 3:
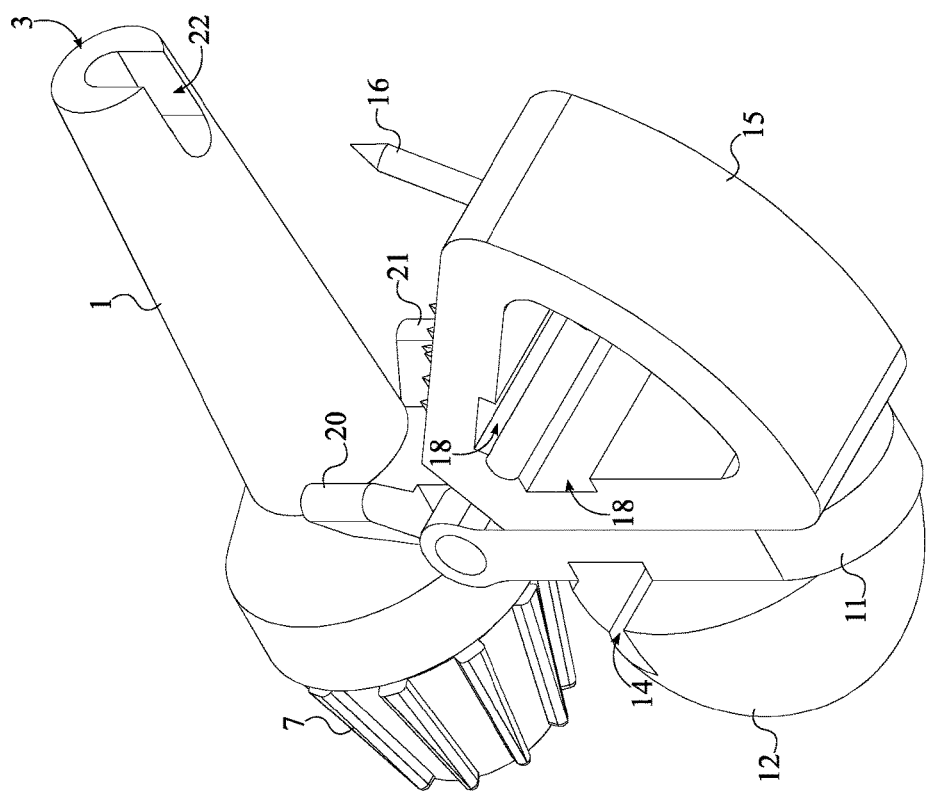
FIG. 3 is a bottom front perspective view of the present invention.

In reference to FIG. 3 and FIG. 5, the present invention further comprises a wedge tie hole 17 and at least one wedge tie notch 18. The wedge tie hole 17 traverses through the weight angling wedge 15 and allows a zip tie, cordage, or another type of fastener to secure the weight angling wedge 15 to the bait fish. The at least one wedge tie notch 18 traverses through the weight angling wedge 15, parallel to the wedge tie hole 17. Further, the at least one wedge tie notch 18 traverses into the weight angling wedge 15 from the wedge tie hole 17. This arrangement allows the at least one wedge tie notch 18 to prevent fasteners from sliding within the weight tie hole 14. As a result, the bait fish may be more securely mounted to the present invention.

In reference to FIG. 1, the present invention further comprises a plurality of grip features 19 which is used to aid the wedge spike 16 in securing the weight angling wedge 15 to the bait fish. The plurality of grip features 19 is connected adjacent to the weight angling wedge 15, opposite to the weight adjustment arm 11. When mounting a bait fish to the present invention, the plurality of grip features 19 is positioned against the bottom of the fish. The plurality of grip features 19 is distributed across the weight angling wedge 15, providing an equal gripping force across the bottom of the bait fish.

In reference to FIGS. 1-3, the present invention further comprises a first mouth-bracing wing 20 and a second mouth-bracing wing 21. Together, the first mouth-bracing wing 20 and the second mouth-bracing wing 21 are used to stabilize bait fish while the present invention is being reeled in or towed in the water. A sagittal plane 23 centrally traverses through the tubular body 1, the weight 12, and the weight adjustment arm 11. The sagittal plane 23 defines a bilateral symmetry for the tubular body 1, the weight 12, and the weight adjustment arm 11. Further, the first mouth-bracing wing 20 and the second mouth-bracing wing 21 mirror each other through the sagittal plane 23. This arrangement between the first mouth-bracing wing 20 and the second mouth-bracing wing 21 causes water to flow around the present invention in a uniform manner. The first mouth-bracing wing 20 and the second mouth-bracing wing 21 are laterally mounted to the tubular body 1 and are angled towards the second end 3. This arrangement helps to reduce the drag created by the first mouth-bracing wing 20 and the second mouth-bracing wing 21.

In reference to FIG. 3, the present invention further comprises a crimp notch 22. The crimp notch 22 is used to conceal and protect a crimp in the fishing line. The crimp notch 22 traverses into the second end 3, perpendicular to the line-receiving hole 4. Because the crimp may otherwise be too large to fit into the line-receiving hole 4, the crimp notch 22 allows the crimp to still be hidden within the tubular body 1.

Although the invention has been explained in relation to its preferred embodiment, it is to be understood that many other possible modifications and variations can be made without departing from the spirit and scope of the invention as hereinafter claimed.

What is claimed is:

1. A bait rigging system comprises:
   a tubular body;
   a line-securing clamp;
   a weight adjustment arm;
   a weight;
   at least one arm spike;
   the tubular body comprises a first end and a second end;
   the line-securing clamp being mounted into the first end;
   the weight adjustment arm being laterally positioned in between the first end and the second end;
   the weight adjustment arm being hingedly connected to the tubular body;
   the weight being laterally connected to the weight adjustment arm;
   the weight being positioned offset from the tubular body along the weight adjustment arm;
   the weight being positioned towards the first end; and
   the at least one arm spike being laterally connected to the weight adjustment arm, opposite to the weight.

2. The bait rigging system as claimed in claim 1 comprises:
   the line-securing clamp comprises a screw, a line-receiving channel, and a compression sleeve;
   the tubular body further comprises a line-receiving hole, a tapered hole, and a female threaded cavity;
   the line-receiving hole traversing into the tubular body from the second end;
   the female threaded cavity traversing into the tubular body from the first end;
   the tapered hole traversing through the tubular body from the female threaded cavity to the line-receiving hole;
   the screw being threadably engaged to the female threaded cavity;
   the line-receiving channel centrally traversing through and along the screw;
   the line-receiving channel being concentrically aligned with the line-receiving hole; and
   the compression sleeve being pressed into the tapered hole by the screw.

3. The bait rigging system as claimed in claim 1 comprises:
   a weight tie hole; and
   the weight tie hole traversing through the weight and the weight adjustment arm.

4. The bait rigging system as claimed in claim 1 comprises:
   the at least one arm spike being positioned perpendicular to the weight adjustment arm.

5. The bait rigging system as claimed in claim 1 comprises:
   a weight angling wedge;
   at least one wedge spike;
   the weight angling wedge being mounted onto the arm spike;
   the at least one wedge spike being connected adjacent to the weight angling wedge, opposite to the weight adjustment arm; and
   the at least one wedge spike being oriented towards the second end.

6. The bait rigging system as claimed in claim 5 comprises:
   an wedge tie hole;
   at least one wedge tie notch;

the wedge tie hole traversing through the weight angling wedge;

the at least one wedge tie notch traversing through the weight angling wedge, parallel to the wedge tie hole; and the at least one wedge tie notch traversing into the weight angling wedge from the wedge tie hole.

7. The bait rigging system as claimed in claim 5 comprises:

a plurality of grip features;

the plurality of grip features being connected adjacent to the weight angling wedge, opposite to the weight adjustment arm; and the plurality of grip features being distributed across the weight angling wedge.

8. The bait rigging system as claimed in claim 1 comprises:

a first mouth-bracing wing;

a second mouth-bracing wing;

a sagittal plane centrally traversing through the tubular body, the weight, and the weight adjustment arm;

the first mouth-bracing wing and the second mouth-bracing wing mirroring to each other through the sagittal plane;

the first mouth-bracing wing and the second mouth-bracing wing being laterally mounted to the tubular body; and the first mouth-bracing wing and the second mouth-bracing wing being angled towards the second end.

9. The bait rigging system as claimed in claim 1 comprises:

a crimp notch; and the crimp notch traversing into the second end.

10. The bait rigging system as claimed in claim 1 comprises:

the tubular body tapering from the first end to the second end.

11. A bait rigging system comprises:

a tubular body;

a line-securing clamp;

a weight adjustment arm;

a weight;

at least one arm spike;

a weight angling wedge;

at least one wedge spike;

the tubular body comprises a first end and a second end;

the line-securing clamp being mounted into the first end;

the weight adjustment arm being laterally positioned in between the first end and the second end;

the weight adjustment arm being hingedly connected to the tubular body;

the weight being laterally connected to the weight adjustment arm;

the weight being positioned offset from the tubular body along the weight adjustment arm;

the weight being positioned towards the first end;

the at least one arm spike being laterally connected to the weight adjustment arm, opposite to the weight;

the weight angling wedge being mounted onto the arm spike;

the at least one wedge spike being connected adjacent to the weight angling wedge, opposite to the weight adjustment arm; and the at least one wedge spike being oriented towards the second end.

12. The bait rigging system as claimed in claim 11 comprises:

the line-securing clamp comprises a screw, a line-receiving channel, and a compression sleeve;

the tubular body further comprises a line-receiving hole, a tapered hole, and a female threaded cavity;

the line-receiving hole traversing into the tubular body from the second end;

the female threaded cavity traversing into the tubular body from the first end;

the tapered hole traversing through the tubular body from the female threaded cavity to the line-receiving hole;

the screw being threadably engaged to the female threaded cavity;

the line-receiving channel centrally traversing through and along the screw;

the line-receiving channel being concentrically aligned with the line-receiving hole; and the compression sleeve being pressed into the tapered hole by the screw.

13. The bait rigging system as claimed in claim 11 comprises:

a weight tie hole; and the weight tie hole traversing through the weight and the weight adjustment arm.

14. The bait rigging system as claimed in claim 11 comprises:

the at least one arm spike being positioned perpendicular to the weight adjustment arm.

15. The bait rigging system as claimed in claim 11 comprises:

an wedge tie hole;

at least one wedge tie notch;

the wedge tie hole traversing through the weight angling wedge;

the at least one wedge tie notch traversing through the weight angling wedge, parallel to the wedge tie hole; and the at least one wedge tie notch traversing into the weight angling wedge from the wedge tie hole.

16. The bait rigging system as claimed in claim 11 comprises:

a plurality of grip features;

the plurality of grip features being connected adjacent to the weight angling wedge, opposite to the weight adjustment arm; and the plurality of grip features being distributed across the weight angling wedge.

17. The bait rigging system as claimed in claim 11 comprises:

a first mouth-bracing wing;

a second mouth-bracing wing;

a sagittal plane centrally traversing through the tubular body, the weight, and the weight adjustment arm;

the first mouth-bracing wing and the second mouth-bracing wing mirroring to each other through the sagittal plane;

the first mouth-bracing wing and the second mouth-bracing wing being laterally mounted to the tubular body; and the first mouth-bracing wing and the second mouth-bracing wing being angled towards the second end.

18. The bait rigging system as claimed in claim 11 comprises:

a crimp notch; and the crimp notch traversing into the second end.

19. The bait rigging system as claimed in claim 11 comprises:

the tubular body tapering from the first end to the second end.

* * * * *